(12) United States Patent
Chen et al.

(10) Patent No.: US 8,600,424 B2
(45) Date of Patent: Dec. 3, 2013

(54) METHOD AND APPARATUS FOR MANAGING DOWNLINK TRANSMISSION POWER IN A HETEROGENEOUS NETWORK

(75) Inventors: Wanshi Chen, San Diego, CA (US); Juan Montojo, San Diego, CA (US); Aamod Dinkar Khandekar, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 12/816,134

(22) Filed: Jun. 15, 2010

(65) Prior Publication Data
US 2010/0323745 A1    Dec. 23, 2010

Related U.S. Application Data

(60) Provisional application No. 61/218,829, filed on Jun. 19, 2009.

(51) Int. Cl.
*H04W 74/00* (2009.01)
(52) U.S. Cl.
USPC ............ 455/522; 455/69; 455/13.4; 455/561; 370/318; 370/328; 713/320
(58) Field of Classification Search
USPC ........ 455/522, 69, 13.4, 127.5, 561; 370/318, 370/252, 328; 713/320
See application file for complete search history.

(56) References Cited

U.S. PATENT DOCUMENTS

2008/0130593 A1*  6/2008  Scheinert et al. ............. 370/337
2008/0188265 A1   8/2008  Carter et al.

FOREIGN PATENT DOCUMENTS

| JP | 11252636 A | 9/1999 |
| JP | 2007195175 A | 8/2007 |
| KR | 100860153 B1 | 9/2008 |
| WO | WO2005062798 A2 | 7/2005 |
| WO | WO2007044281 | 4/2007 |
| WO | 2007082883 A1 | 7/2007 |

OTHER PUBLICATIONS

International Search Report and Written Opinion—PCT/US2010/039270, International Search Authority—European Patent Office—Nov. 11, 2010.

(Continued)

*Primary Examiner* — Shaima Q Aminzay
(74) *Attorney, Agent, or Firm* — Kam T. Tam

(57) ABSTRACT

A method, an apparatus, and a computer program product for wireless communication are provided in which it is determined that a transmission of a first instance of control information in a first control region in a subframe of a first power class eNodeB a non-modified power spectral density (PSD) will result in interference above a threshold with a transmission of a second instance of control information in a second control region in a subframe of a second power class eNodeB, PSD is modified for a portion of at least one of the first or second control regions of at least one of the subframes for at least one of the first power class or second power class eNodeB, and the first instance of control information is transmitted during the control region using the modified PSD for the portion of the first instance of control information.

36 Claims, 10 Drawing Sheets

(56) References Cited

OTHER PUBLICATIONS

Vodafone et al: "HNB Radio Resource Management Considerations" 3GPP Draft; R4-081595, 3rd Generation Partnership Project (3GPP), Mobile Competence Centre ; 650, Route Des Lucioles ; F-06921 Sophia-Antipolis Cedex ; France, vol. RAN WG4, No. Munich, Germany; Jun. 13, 2008, XP050180142.

3GPP, "Fractional Power Control using Pilot Power Ratio Measurements for the E-UTRA Uplink," Alcatel-Lucent, R1-070322, Jan. 19, 2007.

3GPP, "Open Loop vs. Closed Loop Inter-cell Power Control Performance Comparison for the E-UTRA Uplink," Lucent Technologies, R1-063479, Nov. 10, 2006.

* cited by examiner

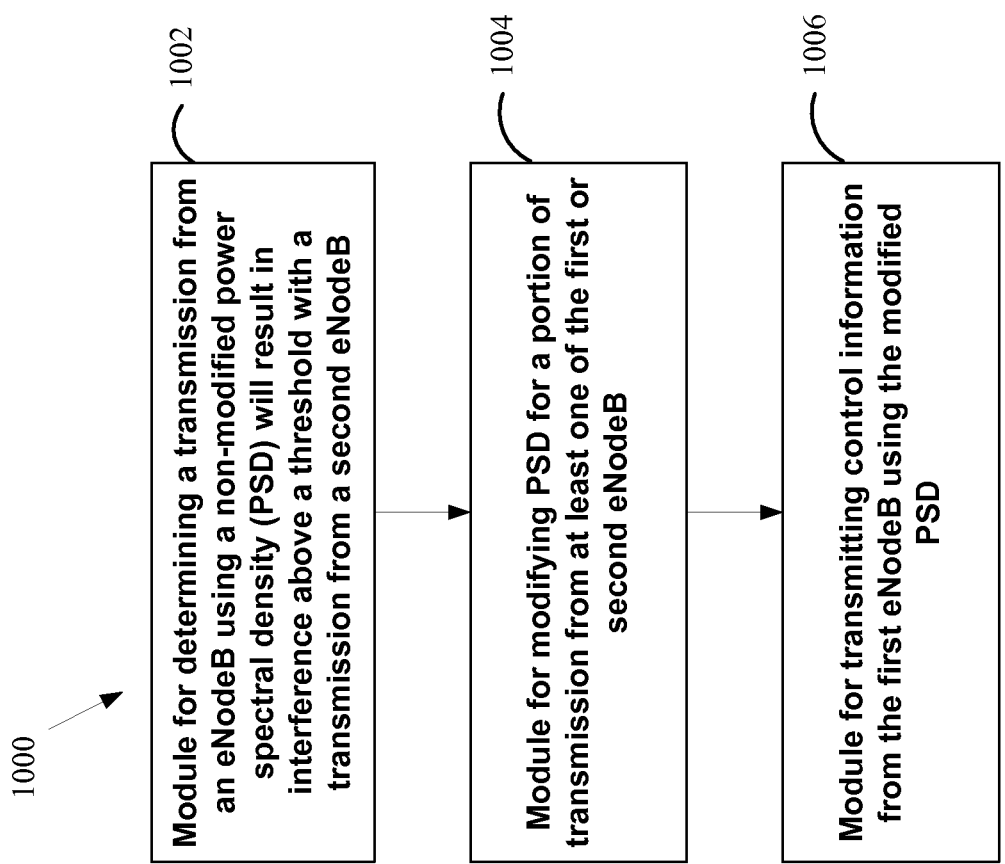

METHOD AND APPARATUS FOR MANAGING DOWNLINK TRANSMISSION POWER IN A HETEROGENEOUS NETWORK

CROSS-REFERENCE TO RELATED APPLICATION(S)

This application claims the benefit of U.S. Provisional Application Ser. No. 61/218,829, entitled "SYSTEMS AND METHODS OF SUBFRAME DEPENDENT DL POWER MANAGEMENT IN LTE/LTE-A HETEROGENEOUS NETWORKS," filed on Jun. 19, 2009, which is expressly incorporated by reference herein in its entirety.

BACKGROUND

1. Field

The present disclosure relates generally to communication systems, and more particularly, to downlink (DL) power management in heterogeneous wireless communications networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the DL, SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with DL power management in a heterogeneous network. The method can comprise determining a transmission of a first instance of control information in a first control region in a subframe of a first power class eNodeB using a non-modified power spectral density (PSD) will result in interference above a threshold with a transmission of a second instance of control information in a second control region in a subframe of a second power class eNodeB, modifying PSD for a portion of at least one of the first or second control regions of at least one of the subframes for at least one of the first power class or second power class eNodeB, and transmitting the first instance of control information during the control region using the modified PSD for the portion of the first instance of control information.

Yet another aspect relates to an apparatus. The apparatus can include means for determining a transmission of a first instance of control information in a first control region in a subframe of a first power class eNodeB using a non-modified PSD will result in interference above a threshold with a transmission of a second instance of control information in a second control region in a subframe of a second power class eNodeB, means for modifying PSD for a portion of at least one of the first or second control regions of at least one of the subframes for at least one of the first power class or second power class eNodeB, and means for transmitting the first instance of control information during the control region using the modified PSD for the portion of the first instance of control information.

Still another aspect relates to a computer program product comprising a computer-readable medium. The computer-readable medium can include code for determining a transmission of a first instance of control information in a first control region in a subframe of a first power class eNodeB using a non-modified PSD will result in interference above a threshold with a transmission of a second instance of control information in a second control region in a subframe of a second power class eNodeB, modifying PSD for a portion of at least one of the first or second control regions of at least one of the subframes for at least one of the first power class or second power class eNodeB, and transmitting the first instance of control information during the control region using the modified PSD for the portion of the first instance of control information.

Another aspect relates to an apparatus for wireless communications. The apparatus can include processing system configured to determine a transmission of a first instance of control information in a first control region in a subframe of a first power class eNodeB using a non-modified PSD will result in interference above a threshold with a transmission of a second instance of control information in a second control region in a subframe of a second power class eNodeB, modify PSD for a portion of at least one of the first or second control regions of at least one of the subframes for at least one of the first power class or second power class eNodeB, and transmit the first instance of control information during the control region using the modified PSD for the portion of the first instance of control information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a conceptual block diagram illustrating the functionality of an exemplary apparatus.

DETAILED DESCRIPTION

Figure 1:
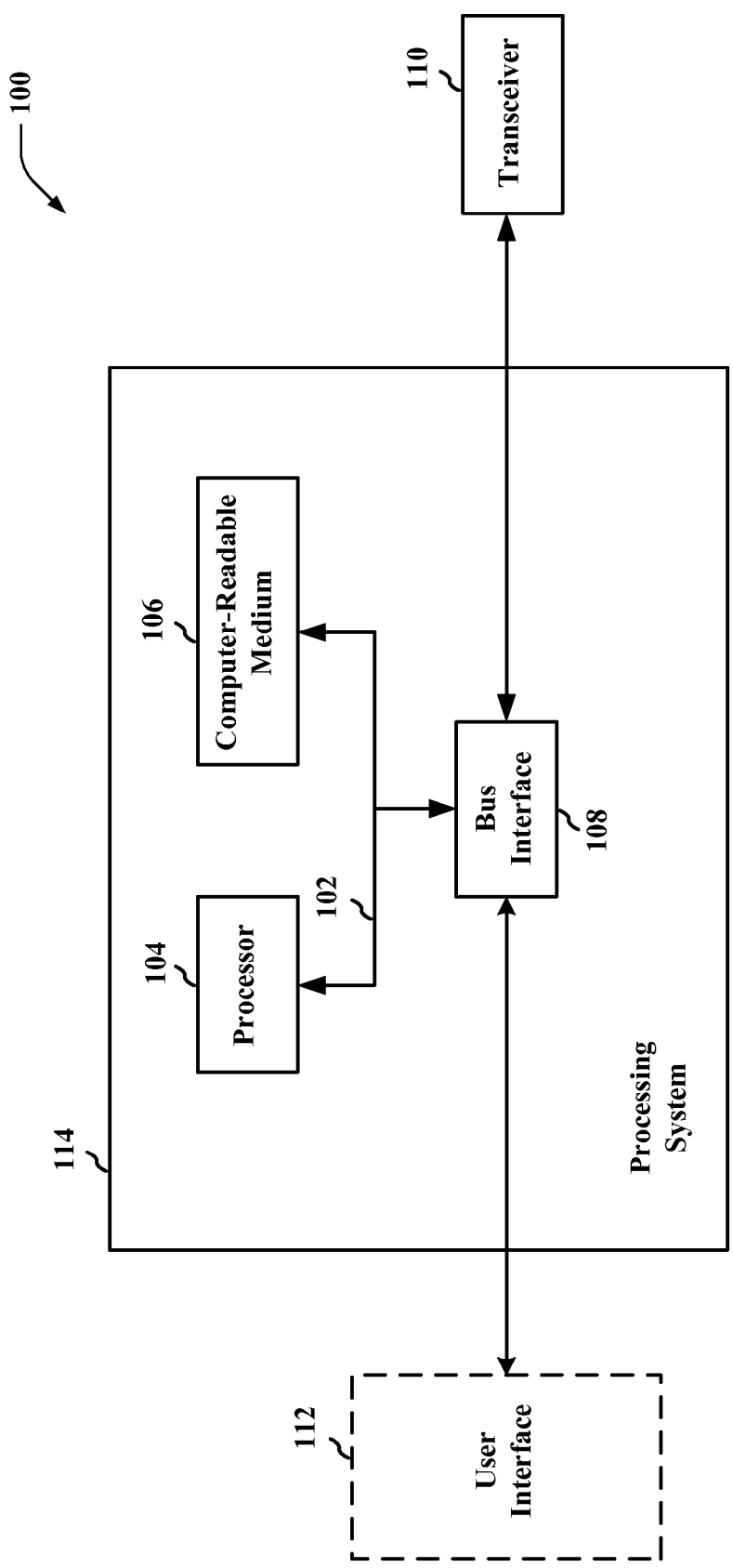
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by processor 104, and computer-readable media, represented generally by computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
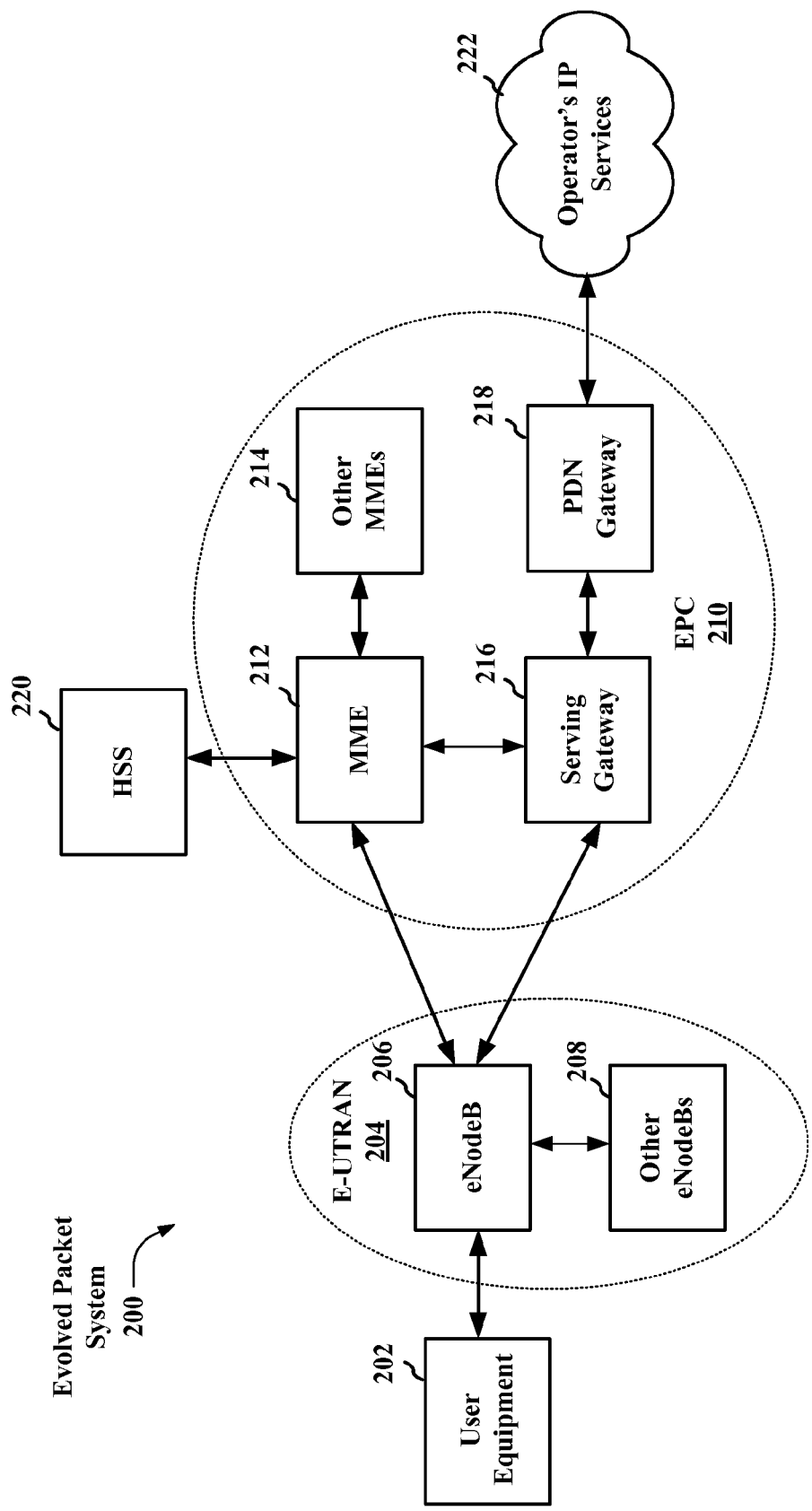
FIG. 2 is a diagram illustrating an example of a network architecture.

FIG. 2 is a diagram illustrating an LTE network architecture 200 employing various apparatuses 100 (see FIG. 1). The LTE network architecture 200 may be referred to as an Evolved Packet System (EPS) 200. The EPS 200 may comprise one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 206 and other eNodeBs 208. The eNodeB 206 provides user and control plane protocol terminations toward the UE 202. The eNodeB 206 may be connected to the other eNodeBs 208 via an X2 interface (i.e., backhaul). The eNodeB 206 may also be referred to by those skilled in the art as a base station, a base transceiver station, a radio base station, a radio transceiver, a transceiver function, a basic service set (BSS), an extended service set (ESS), or some other suitable terminology. The eNodeB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
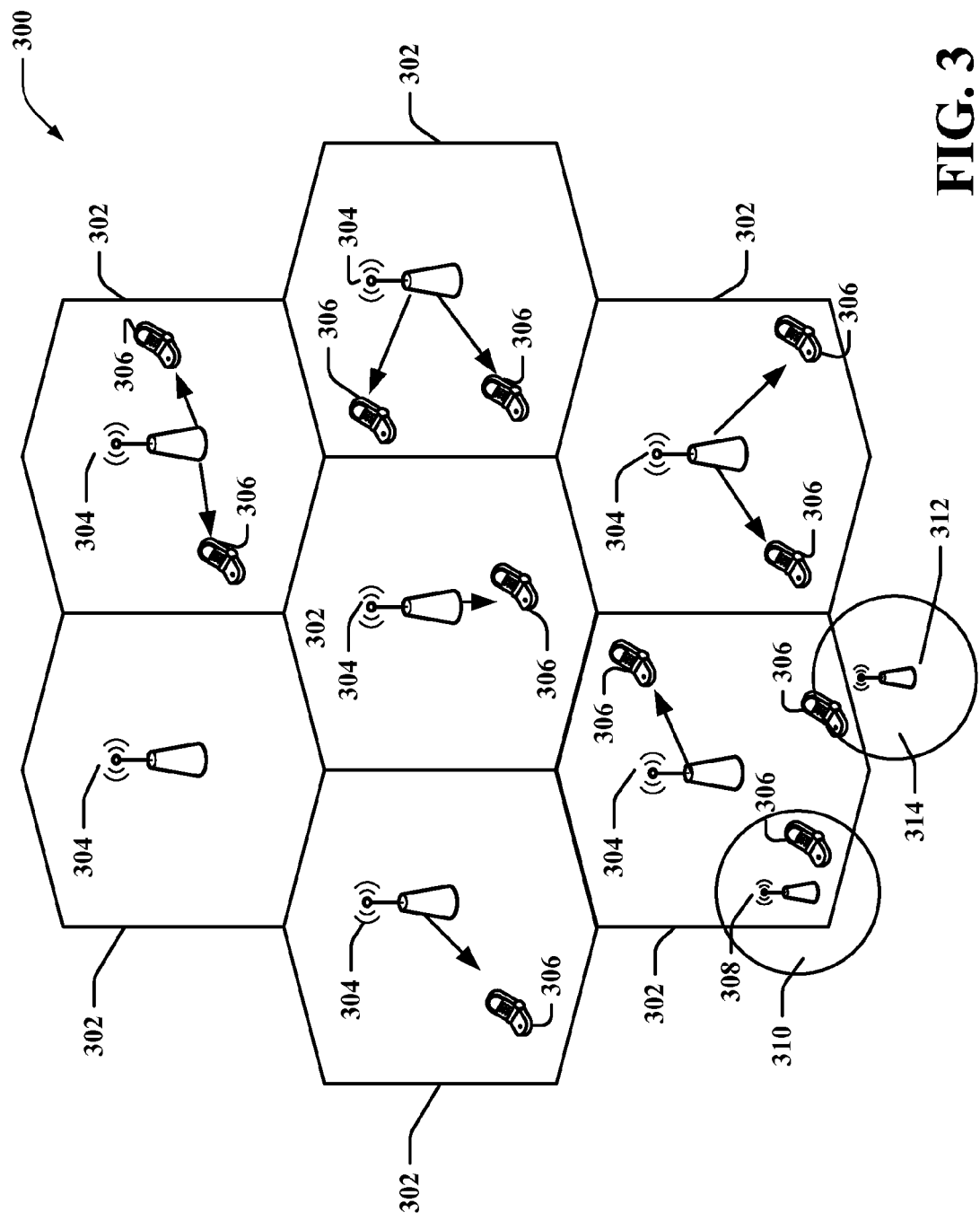
FIG. 3 is a diagram illustrating an example of an access network.

FIG. 3 is a diagram illustrating an example of an access network in an LTE network architecture. In this example, a heterogeneous access network 300 is depicted. In such an aspect, the network 300 is divided into a number of cellular regions (cells) 302. One or more lower power class eNodeBs 308, 312 may have cellular regions 310, 314, respectively, that overlap with one or more of the cells 302. The lower power class eNodeBs 308, 312 may be femto cells (e.g., home eNodeBs (HeNBs)), pico cells, or micro cells. A higher power class or macro eNodeB 304 is assigned to a cell 302 and is configured to provide an access point to the EPC 210 (see FIG. 2) or all the UEs 306 in the cell 302. Further, different power classes may have different settings. For example, a macro eNodeB power class may have different settings, than a femto eNodeB power class, which may be different settings than a pico eNodeB power class. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 216.

In one exemplary aspect, a heterogeneous network may refer to a network where, besides conventional cellular base stations (macro cells), other types of cells with lower power classes, such as pico cells or relaying cells are present. Due to the power differential between power classes, if UEs are served by cells with DL signals with the greatest strength, only a small fraction of UEs may be associated with pico/relaying cells (e.g., in-coverage UEs). Range expansion (e.g., use of pico cells when DL signal strength of the pico cell is not greater than DL signal strength from macro cell) may be used for increased macro cell offloading and cell-splitting gain. As such, UEs may be served by pico/relaying cells even if the DL signal from the serving pico/relaying cell is weaker than an interfering macro cell DL signal (however, serving pico cell UL may still be more efficient than macro cells). As used herein, UEs served by picos/relays due to range expansion may be referred to as range expansion UEs. Range expansion UEs may observe strong DL interference from macro cells where resource (e.g., time/frequency) orthogonalization is not used.

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the DL. The spatially precoded data streams arrive at the UE(s) 306 with different spatial signatures, which enables each of the UE(s) 306 to recover the one or more data streams destined for that UE 306. On the UL, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 4:
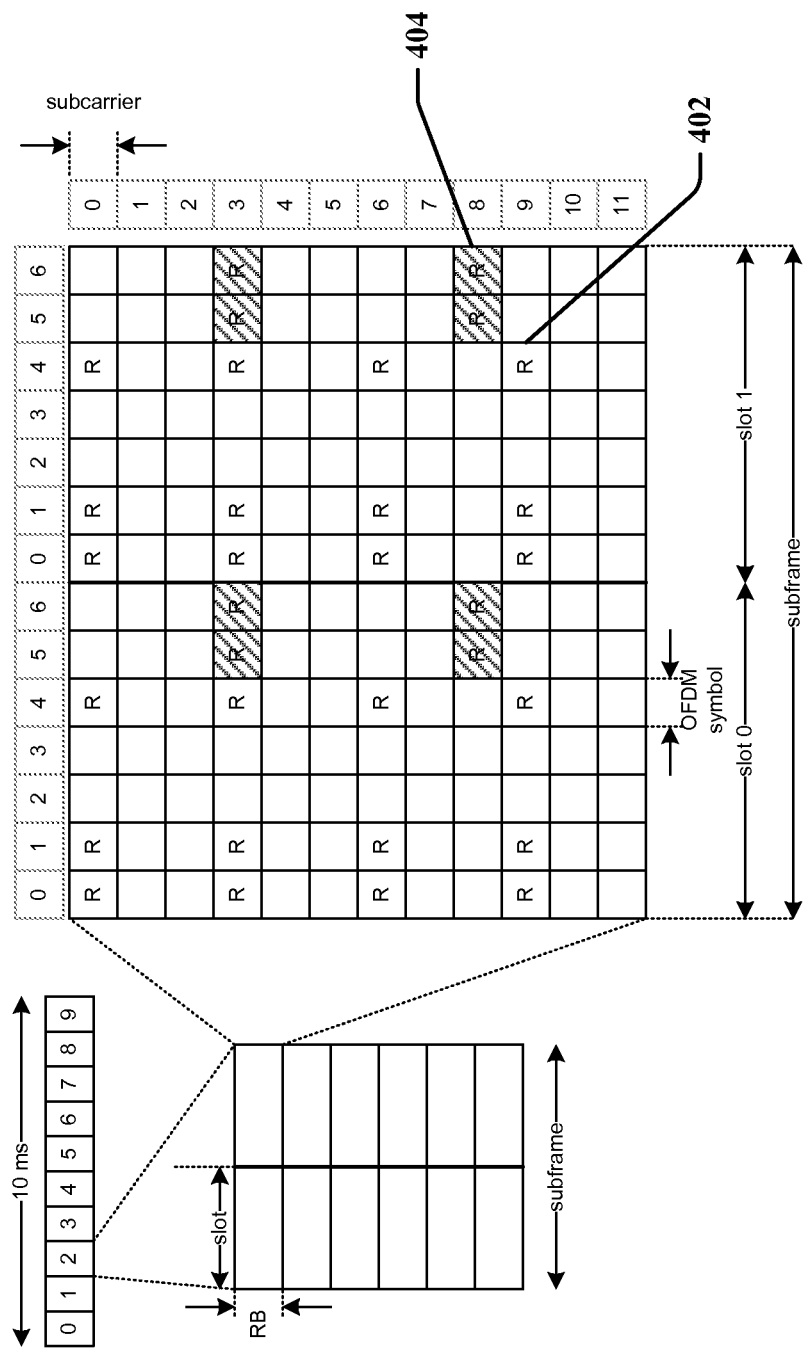
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include a DL reference signal (DL-RS). The DL-RS include Cell-specific RS (CRS) (also sometimes called common RS) 402 and UE-specific RS (UE-RS) 404. UE-RSs 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
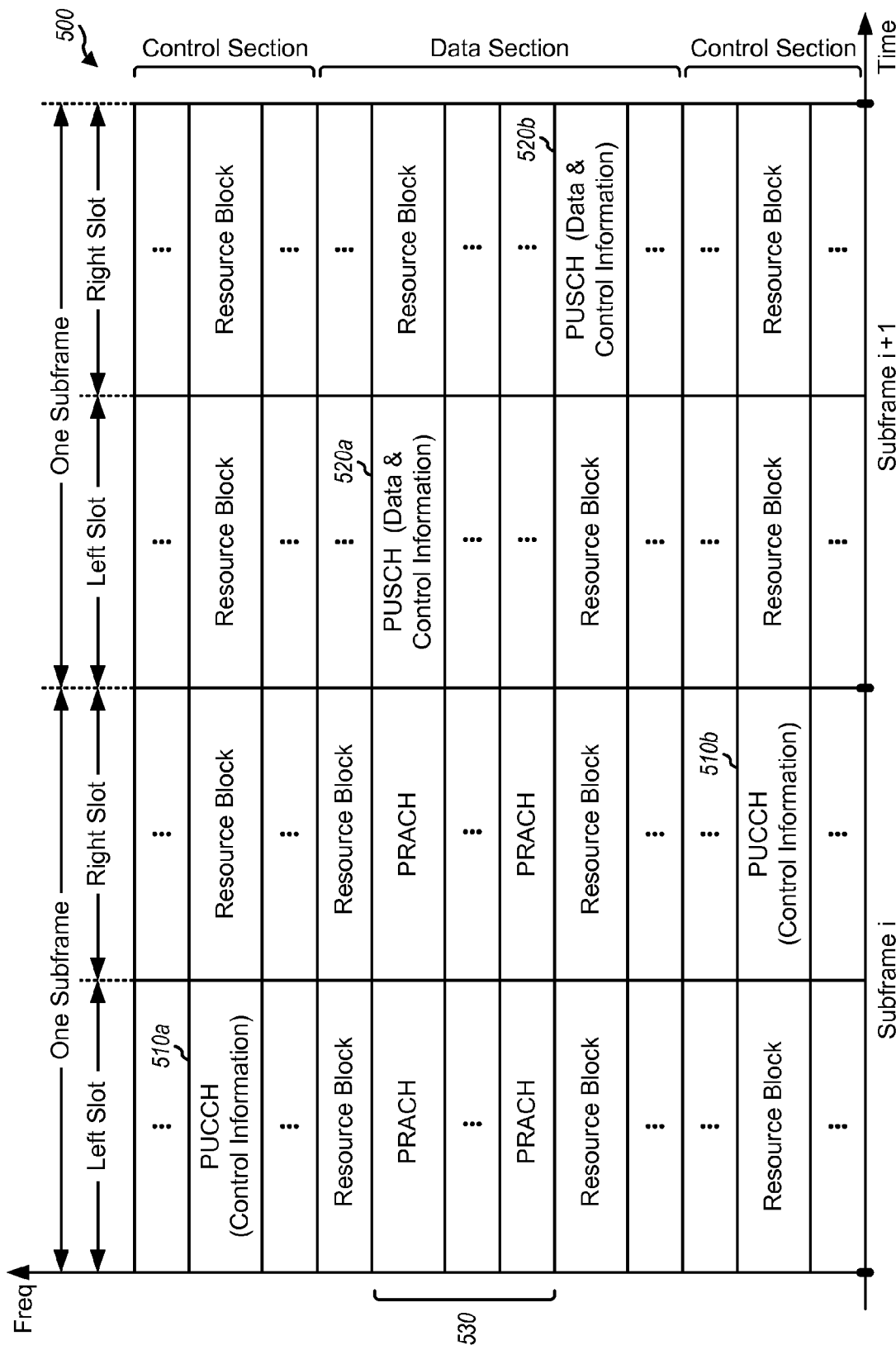
FIG. 5 shows an exemplary format for the UL in LTE.

An example of a UL frame structure will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNodeB. The UE may also be assigned resource blocks 520a, 520b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH). The PRACH carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
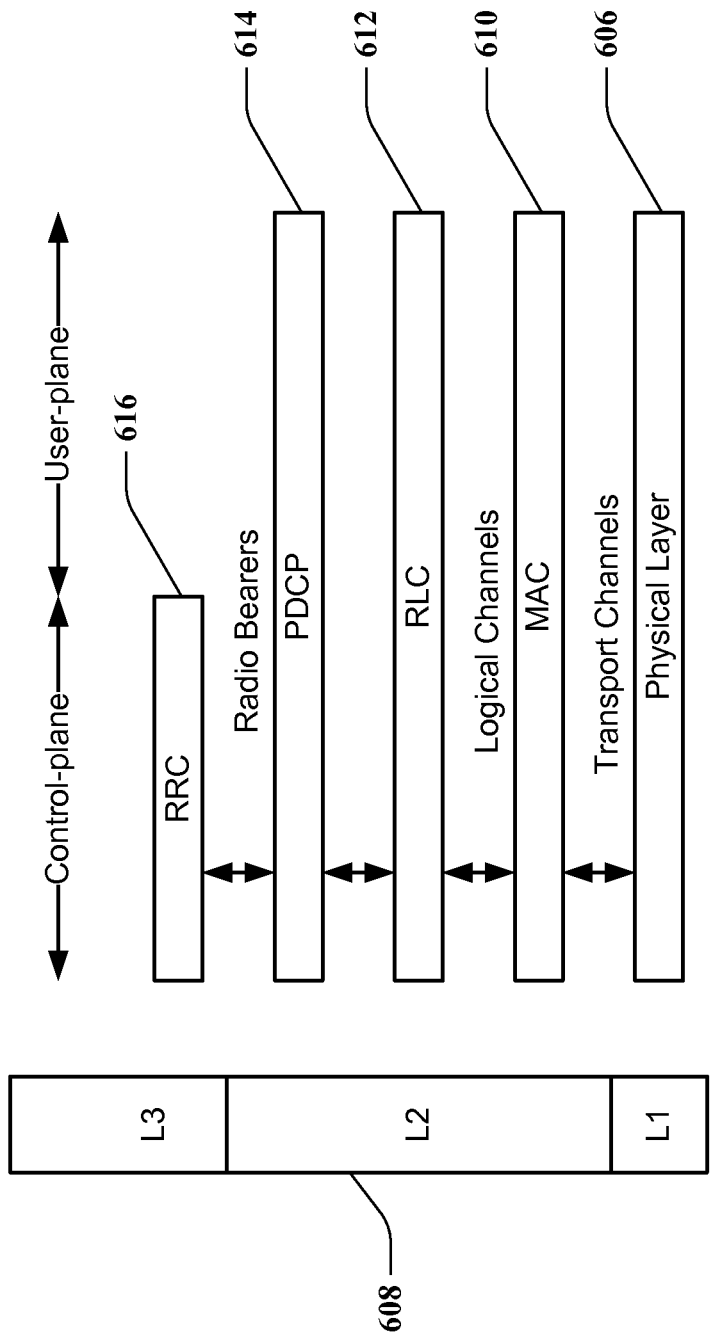
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNodeB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNodeB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNodeB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNodeBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNodeB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNodeB and the UE.

Figure 7:
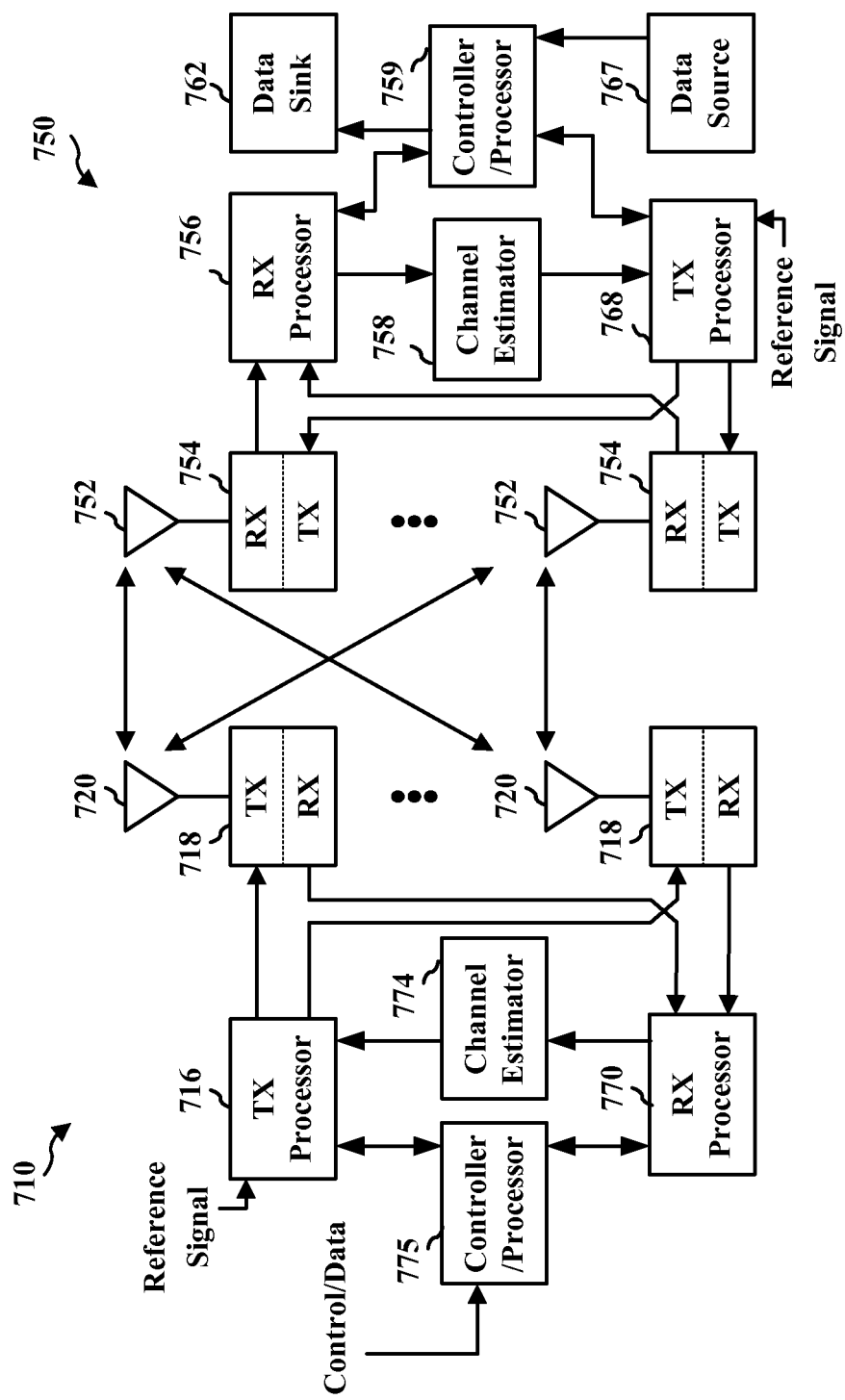
FIG. 7 is a diagram illustrating an example of an evolved Node B and user equipment in an access network.

FIG. 7 is a block diagram of an eNodeB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 710. These soft decisions may be based on channel estimates computed by the channel estimator 758. The soft decisions are then decoded and deinterleaved to recover the data and control signals that were originally transmitted by the eNodeB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNodeB 710, the controller/processor 759 implements the L2 layer for the user plane and the control plane by providing header compression, ciphering, packet segmentation and reordering, and multiplexing between logical and transport channels based on radio resource allocations by the eNodeB 710. The controller/processor 759 is also responsible for HARQ operations, retransmission of lost packets, and signaling to the eNodeB 710.

Channel estimates derived by a channel estimator 758 from a reference signal or feedback transmitted by the eNodeB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNodeB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK/NACK protocol to support HARQ operations.

The processing system 114 described in relations to FIG. 1 includes the eNodeB 710. In particular, the processing system 114 includes the TX processor 716, the RX processor 770, and the controller/processor 775.

Figure 8:
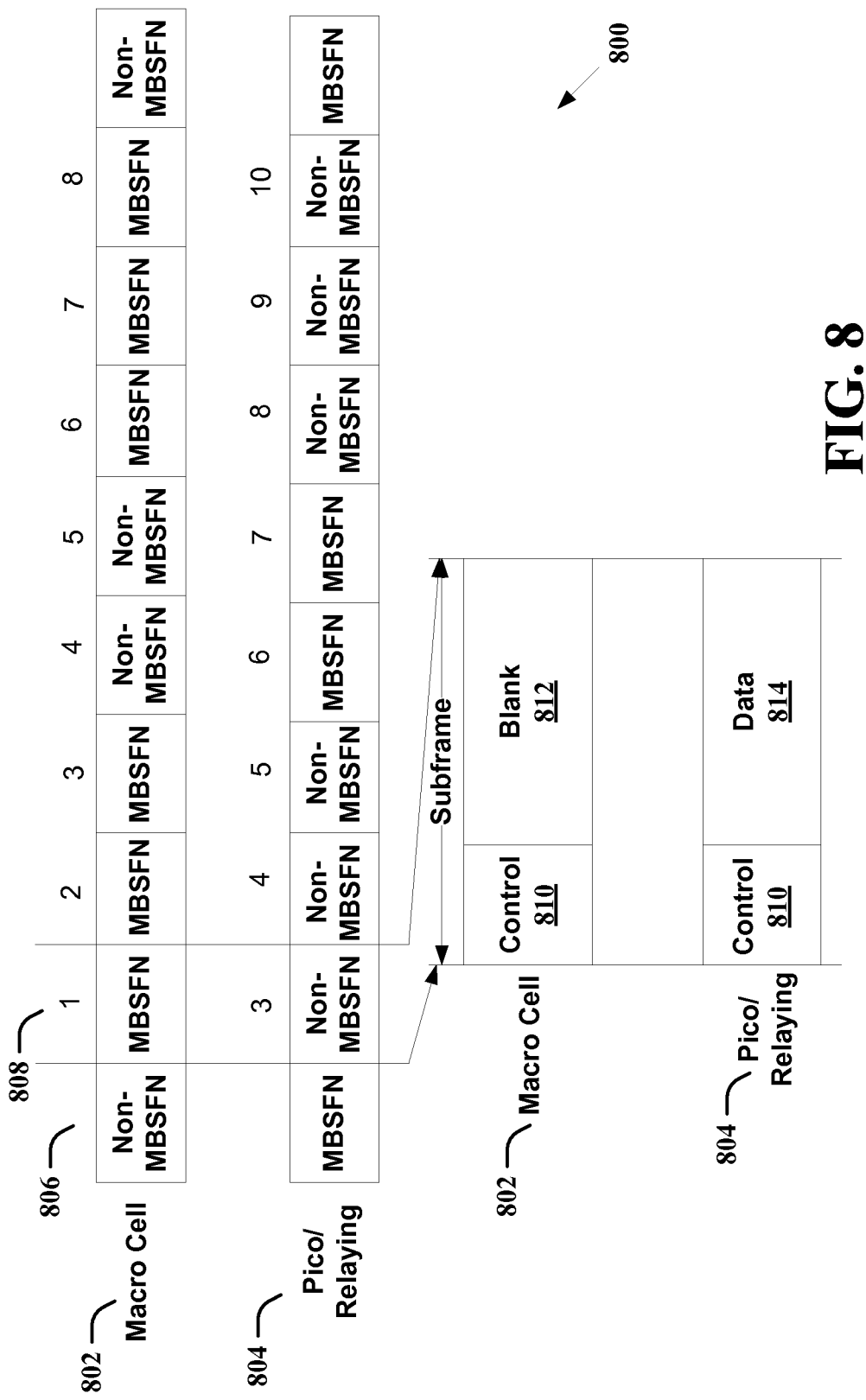
FIG. 8 is a diagram illustrating an example of MBSFN based frames for use in an access network.

FIG. 8 is a block diagram illustrating Multimedia Broadcast over a Single Frequency Network (MBSFN) subframe alignment in a heterogeneous network 800, according to an aspect. As depicted in FIG. 8, the heterogeneous network 800 is depicted with MBSFN subframes 808 and non-MBSFN subframes 806 as present in one or more macro cells 802 and pico cells 804. Further, each subframe may include a control 810 region in which control information may be communicated. The remainder of the subframe may be used to communicate data 814 and/or may be left blank 812.

In LTE Rel-8, control and data are time division multiplexed. A control region always spans the entire system bandwidth and may occupy at least one OFDM symbol. Further, a CRS, a physical control format indicator channel (PCFICH), and a physical hybrid ARQ indicator channel (PHICH) may be reserved and/or transmitted in the control region. For example, in one aspect, the PHICH may be reserved and the eNodeB 710 may select a zero transmit power for the PHICH, thereby effectively resulting in no transmission of PHICH. Further, a physical downlink control channel (PDCCH) may at least be transmitted for the purpose of paging. As such, if time-domain resource orthogonalization is used, for range expansion UEs, at least one control symbol may be interfered with by a macro cell. On the other hand, a data region of a subframe can be blanked via configuring the subframes as MBSFN subframes, and hence complete resource orthogonalization in the data region is possible.

Returning to FIG. 8, in one exemplary aspect, network 800 may be operable to use MBSFN based time-domain resource orthogonalization, where macro cells 802 and pico cells 804 may be synchronous. In one aspect, a subframe (806, 808) time shift may be applied such that a macro cell 802 non- MBSFN subframe 806 may coincide with a pico cell 804 MBSFN subframe 808. In another aspect, no time shift may be applied. In yet another aspect, subframe types (e.g., non-MBSFN 806, MBSFN 808, etc.) may not be complementary. For example, a MBSFN subframe 808 in macro cell 802 may collide with MBSFN or non-MBSFN subframes in a pico cell 804. In another example, a non-MBSFN subframe 806 in macro cell 802 may also collide with MBSFN or non-MBSFN subframes in a pico cell 804. In the depicted aspect, when macro cells 802 are non-MBSFN subframes 806, the pico cells 804 may have either MBSFN subframes 808 or non-MBSFN subframes 806. In the latter case, the pico cells 804 can serve UEs with the coverage region. In such an operable configuration, pico cell 804 may perform DL communications with UEs served by the pico cell 804 with reduced interference from the macro cell 802.

Further, although a portion of the macro cell 802 MBSFN subframe 808 may be blank 812, control information 810 may still be transmitted and as such cause interference with control information 810 being transmitted by a pico cell 804. In operation, various regions allocated for control information 810, blank 812, data 814, etc., for the macro and pico cells may not be aligned. In another operational aspect, various regions allocated for control information 810, blank 812, data 814, etc., for the macro and pico cells may not be the same size.

Multiple schemes may be used to attempt to reduce this interference. For example, the macro cell 802 may reduce transmit power for the MBSFN subframe 808. In such an exemplary configuration, the network 800 may function as a homogenous network, and conventional resource management can be adopted. On the other hand, UEs at the cell edge may experience reduced coverage. In another example, a totally blank subframe may be used by the macro cell 802. In such an exemplary configuration, clean and complete resource orthogonalization may be available for the pico cell 804 DL transmissions. On the other hand, potential backward compatibility issues with older UEs may arise, such as lost measurements, channel estimation, HARQ operation, etc. In another example, control information may be communicated in the data 814 section of a subframe. In such an exemplary configuration, complete resource orthogonalization may be available for the pico cell 804 DL transmissions. On the other hand, a portion of the subframe previously available for data may no longer be available, and potential backward compatibility issues with older UEs may arise. In another example, a UE may implement interference cancellation. In such an exemplary configuration, macro cell 802 interference may be reduced. On the other hand, UE based interference cancellation may result in increased complexity in UE design and potential backward compatibility issues with older UEs may arise.

In one aspect, in order to minimize the interference from macro cells 802 to the pico cells 804 in the control region 810, the transmit power of the control region 810 in the MBSFN subframes 808 in the macro cells 802 may be limited when a pico cell 804 is transmitting. In other words, instead of transmitting the control region 810 of macro cell 802 using a standard PSD, a restricted PSD may be used instead. In one aspect, the restricted PSD may be based on the coverage constraints of UEs associated with the pico cell 804. For example, a limited PSD may be used such that the macro cell 802 PSD is comparable to the PSD transmitted in the pico cell 804. As such, UEs served by the pico cell 804 (e.g., range expansion UEs) may experience improved DL signal reception from the serving pico cell 804 in the control region 810.

In one aspect, a modified or restricted PSD of macro control region PSD may be treated on a per channel basis. For example, certain channels may be restricted, such as, a CRS, a PCFICH, a PHICH or a PDCCH. In one aspect, with respect to PCFICH, if no other control signals (e.g., PHICH or PDCCH) are scheduled for transmission, then the PCFICH may be transmitted with minimum power or zero power. In one aspect, with respect to the PHICH, if no transmissions are scheduled, PHICH transmission may be discontinued. Otherwise, the PHICH may be transmitted with limited PSD and/or power controlled to meet the specific UE requirements. In one aspect, with respect to the PDCCH, if no transmissions are scheduled, PDCCH transmission may be discontinued. Otherwise, the PDCCH may be transmitted with limited PSD and/or power controlled to meet the specific UE requirements.

In one aspect, a modified or restricted PSD scheme may be used in either synchronous or asynchronous systems. With respect to synchronous systems, backwards compatibility issues may be addressed with subframe selection. For example, any effect on LTE Rel-8 UE measurements may be controlled or even eliminated, when measurements are conducted during reserved subframes in LTE Rel-8 (e.g., subframes 0, 4, 5 and 9 in FDD and subframes 0, 1, 5 and 6 in TDD). Further, selected reserved subframes may not be configured as MBSFN subframes. With respect to channel estimation, older UEs (e.g., Rel-8 UEs) may experience issues, if two or more adjacent subframes are used for channel estimation.

Further, in synchronous systems, when PSD restrictions are applied, the entire system may exhibit both heterogeneous and homogeneous features over time. For example, when macro cells 802 are non-MBSFN subframes 808, these subframes exhibit heterogeneous network properties, as a pico cell 804 may be either MBSFN or non-MBSFN. By contrast, when macro cell 802 is MBSFN subframes 808, due to their reduced PSD transmissions, these subframes exhibit homogeneous network properties. These quasi-homogeneous network properties may allow for benefits such as allowing UEs to select the pico cell 804 as a serving cell based on quality of DL transmissions. This may be the case when subframes 0, 4, 5, and 9 of pico cell 804 coincide with macro cell 802 MBSFN subframes 808 with reduced transmit power in the control region.

Further, compared with use of an entirely blank subframe, as discussed above, use of a restricted PSD simplifies support of the PHICH and UL hybrid-ARQ in macro cell 802, since the PHICH may still be transmitted from the macro cell 802 MBSFN subframe 808 control region 810, as the interference level in these subframes may exhibit homogeneous network properties. Further, in network 800, all macro cells 802 may be synchronized, and may be configured using the same mixture of MBSFN and non-MBSFN subframes. In one aspect, the MBSFN subframes for all the macro cells 802 in network 800 may have the same or similar values of reduced transmit power (e.g., modified PSD) in the control region 810. With respect to channel estimation and measurements, use of a restricted PSD scheme may be dependent on the amount of power reduction in the MBSFN subframe 808 control region 810, and generally may be less severe than that of the blank subframe approach. Further, while use of a blank subframe may offer a clean structure for re-designing control signals for newer UEs (e.g., Eal-9+), use of restricted PSD may utilize the existing MBSFN subframe 808 structure, and in these MBSFN subframes 808, there may be at least one symbol configured for control.

Further, compared to non-restricted PSD configurations, use of a restricted PSD scheme may provide support transmission of control information in the control symbols 810 of the pico cells 804 when these symbols would otherwise be colliding with the control region 810 of the MBSFN subframes 808 in the macro cells 802. As such, use of a restricted PSD scheme makes it possible to reuse the existing control structure (e.g., Rel-8), without the need of re-designing control for newer UEs (e.g., Rel-9+ UEs). Further, use of a restricted PSD scheme makes it possible to readily support older UEs (e.g., Rel-8 UEs) in a heterogeneous network. Additionally, use of a restricted PSD scheme may impact measurement and channel estimation. For example, support of PHICH in PSD restricted MBSFN subframes 808 may be compromised if the system is thermal limited, as opposed to interference limited. In other words, for an interference limited configuration, the PHICH coverage in the MBSFN subframes 808 may be compared to that of the non-MBSFN subframes 806 in macro cells 802.

In asynchronous systems, application of a PSD restriction scheme may not affect channel estimation differently than where no PSD restriction scheme is used. With respect to measurements in an asynchronous system, a UE may measure neighboring cells using MBSFN subframes when the serving pico cell 804 is a non-MBSFN subframe. In one aspect, older UEs (e.g., Rel-8 UEs) may have no knowledge whether a neighboring cell is using a non-MBSFN subframe 806 or MBSFN subframe 808. As such, use of a PSD restriction scheme may impact measuring signal strengths from neighboring cells. In one aspect, macro cells 802 may exchange information regarding power restriction levels and synchronization offsets among neighboring cells via backhaul, such that the serving pico cell 804 can make adjustments beyond information received from the UE reported neighbor cell strength. In one aspect, depending on PSD restrictions in a neighboring cell, the UE may not report a neighboring cells signal, as the signal strength may be below a threshold. In another aspect, neighboring cell strength measurements may be affected by the neighboring cell subframes type (e.g., the subframes could be a mixture of MBSFN and non-MBSFN subframes). In another aspect, a UE may estimate a sync offset for the neighboring cell. Still further, in one aspect, different macro cells 802 may apply the same or different power restriction levels. In another aspect, a PSD restriction level may not be applied to all MBSFN subframes 808, and the restriction level in a cell may be the same or different over MBSFN subframes 808. In one aspect, power restriction level may be the same across all cells. However, in another aspect, different power restriction levels may be used in different cells based on various cell configuration factors.

In one operable aspect, where power restriction is applied, subframes may be analyzed as regular MBSFN subframes. In another operation aspect, where power restrictions complete stop transmissions, subframes may be analyzed as if they are blank subframes. As such, the degree of power restriction provides tradeoff between macro cell 802 interference impact on pico cells 804, and the control region accessibility of these subframes to macro cell 802 served UEs.

In another aspect, a UE (e.g., Rel-9+ UE) may be informed which subframes are power restricted in the control region, and any corresponding restriction level(s) for these subframes. As such, newer UEs (e.g., Rel-9+ UEs) may be operable to detect control information in these subframes to more effectively perform channel estimation and measurements. In still another aspect, PSD restrictions applied in the control region 810 may also be combined with the blank and data region (812, 814) for further reduction in transmit power.

Additionally or in the alternative, in one aspect, the transmit power PSD (within a total max power constraint) of the control region of some or all of the MBSFN subframes in the pico cells 804 may be increased such that the control region may have deeper penetration for range pico cell 804 served UES (e.g., expansion UEs), without resulting in extensive impact on macro cell 802 served UEs. In one aspect, if CRSs are to be transmitted over the entire band, for one transmit antenna, a power boost up to 10*log 10(6)=7.8 dB may be achieved. Further, for two transmit antennas, a power boost may drop to 10*log 10(3)=4.8 dB. However, for UL HARQ operation reliable communication of one UL HARQ in the control region of the pico cell 804 MBSFN subframes 808 may be preferable. In such an aspect, CRS may not be transmitted over the entire bandwidth, and instead, CRS may be limited to a fraction of bandwidth occupied by PCFICH and PHICH. In one operational example, PCFICH may be distributed to four resource element groups (REGs), where each REG may include four resource elements. Further, the bandwidth occupied by PHICH may be roughly 1/16 to 3/4 of the system bandwidth. As such, CRS may be transmitted using the REGs. Assuming 10 MHz, 50 RBs, PHICH group size can be as small as two, which translates to 6 REGs. In total, 10 REGs may carry PCFICH and PHICH which translates to 5 RBs, and CRS can be transmitted within these 5 RBs. Therefore, a power boost of 10 dB may be achieved.

Figure 9:
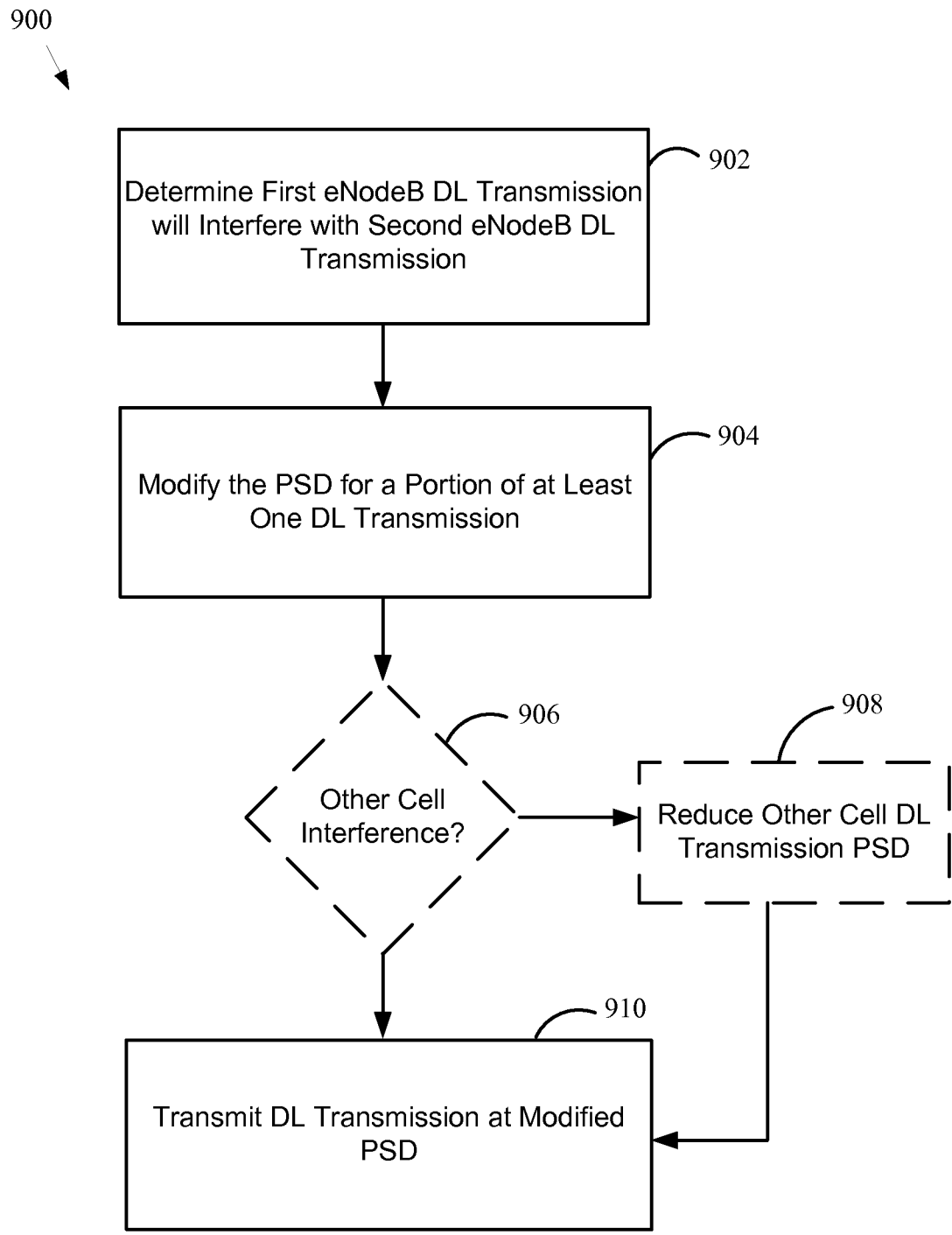
FIG. 9 is a flow chart of a method of wireless communication.

FIG. 9 is a flow chart 900 of a method of wireless communication. The method may include determining a first eNodeB DL transmission may interfere with a second eNodeB DL transmission (902). In one aspect, the first eNodeB may be a first power class eNodeB (e.g., macro cell, femto cell, etc.) and the second eNodeB may be a second power class eNodeB (e.g., pico cell, macro cell, etc.). In one such aspect, the first and second eNodeBs may be different power classes. In one aspect, the DL transmission may include transmission during a specified subframe. In one such aspect, the subframe of the first eNodeB may be an MBSFN subframe, and the subframe of the second eNodeB may be a non-MBSFN subframe.

In addition, the method may include modifying PSD for a portion of the DL transmission for at least one of the first or second eNodeBs (904). In one aspect, the modifying may include reducing PSD for the control region of the subframe to be transmitted by the first eNodeB. In one such aspect, the PSD of only a portion of the control region communicates may be reduced. For example, PSD reduction may be performed on a per-channel basis. In one aspect, channels which may have PSD modified include, but are not limited to, a CRS, a PCFICH, a PHICH or a PDCCH. In another aspect, certain channels may be scheduled for transmission in such a manner as to avoid subframes which interfere with DL control channel information transmitted by the second eNodeB. In one aspect, the modifying may include increasing PSD for the control region of the subframe to be transmitted by the second eNodeB. In another aspect, any combination of reducing PSD for the first eNodeB and increasing PSD for the second eNodeB may be used. In another aspect, a selected number of subframes may have PSD modification. In one aspect, the selected subframes may be communicated to the second eNodeB and/or UEs served by the second eNodeB Additionally, and/or in the alternative, the method may determine if interference of the second eNodeB DL transmission may come from one or more other cells (906). If it is determined that interference of the second eNodeB DL transmission may come from one or more other cells, then the first or second eNodeB may prompt one or more eNodeBs in the other cells to perform PSD reduction for the subframe during which the second eNodeB is communicating (908). In one aspect, all cells may use the same PSD modification scheme. In another aspect, each cell may modify PSD of DL transmissions differently depending on factors associated with each cell and/or affected UEs.

Furthermore, the method may include transmitting DL communications using the modified PSD values (910). For example, the first eNodeB may transmit a portion of control information during a subframe at a reduced PSD and/or the second eNodeB may transmit at least control information at an increased PSD during the subframe.

FIG. 10 is a conceptual block diagram 1000 illustrating the functionality of an exemplary apparatus 100. The apparatus 100 includes a module 1002 which determines that a transmission of a first instance of control information in a first control region in a subframe of a first power class eNodeB using a non-modified PSD will result in interference above a threshold with a transmission of a second instance of control information in a second control region in a subframe of a second power class eNodeB, a module 1004 that modifies PSD for a portion of at least one of the first or second control regions of at least one of the subframes for at least one of the first power class or second power class eNodeB, and a module 1006 that transmits the first instance of control information during the control region using the modified PSD for the portion of the first instance of control information.

Referring to FIG. 1 and FIG. 7, in one configuration, the apparatus 100 for wireless communication includes means for determining a transmission of a first instance of control information in a first control region in a subframe of a first power class eNodeB using a non-modified PSD will result in interference above a threshold with a transmission of a second instance of control information in a second control region in a subframe of a second power class eNodeB, means for modifying PSD for a portion of at least one of the first or second control regions of at least one of the subframes for at least one of the first power class or second power class eNodeB, and means for transmitting the first instance of control information during the control region using the modified PSD for the portion of the first instance of control information. In another configuration, the apparatus 100 includes means for reducing PSD for the portion of the first control region of the subframe of the first power class eNodeB. In another configuration, the apparatus 100 includes means for reducing PSD for one or more channels scheduled for transmission during the control region, wherein the one or more channels comprise at least one of a CRS, a PCFICH, a PHICH or a PDCCH. In another configuration, the apparatus 100 includes means for scheduling transmission of control channel information for a subframe other than the subframe of the first power class eNodeB that results in interference with subframe of the subframe of the second power class eNodeB. In another configuration, the apparatus 100 includes means for transmitting a message indicating which one or more of a plurality of subframes is transmitted using the modified PSD. In such an aspect, the message may be transmitted to a least one of the second power class eNodeB or one or more UEs served by the second power class eNodeB. In another configuration, the apparatus 100 includes means for determining transmissions from one or more other first power class eNodeB will result in interference above the threshold with the transmission of the second instance of control information in the second control region in the subframe of the second power class eNodeB, and means for prompting at least one of the one or more other first power class eNodeBs to modify the PSD of a transmission of a corresponding subframe during the subframe of the first power class eNodeB. In another configuration, the apparatus 100 includes means for increasing the PSD for the portion of the second control region of the subframe of the second power class eNodeB. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
   determining a transmission of a first instance of control information in a first control region in a subframe of a first higher power class eNodeB using a non-modified power spectral density (PSD) will result in interference above a threshold with a transmission of a second instance of control information in a second control region in a subframe of a second lower power class eNodeB;
   modifying the PSD for a portion of the first control region of the subframe for the first higher power class eNodeB, wherein the modifying comprises reducing the PSD for the portion of the first control region of the subframe of the first higher power class eNodeB; and
   transmitting the first instance of control information during the first control region using the modified PSD for the portion of the first instance of control information.

2. The method of claim 1, wherein the subframe of the first higher power class eNodeB is a multicast broadcast single frequency network (MBSFN) subframe, and wherein the subframe of the second lower power class eNodeB is a non-MBSFN subframe.

3. The method of claim 1, wherein the reducing the PSD for the portion further comprises:

reducing the PSD for one or more channels scheduled for transmission during the control region, wherein the one or more channels comprise at least one of a common reference signal (CRS), a physical control format indicator channel (PCFICH), a physical hybrid ARQ indicator channel (PHICH), or a physical downlink control channel (PDCCH).

4. The method of claim 1, wherein the reducing the PSD for the portion further comprises:
scheduling transmission of control channel information for a subframe other than the subframe of the first higher power class eNodeB that results in interference with the subframe of the second lower power class eNodeB.

5. The method of claim 1, further comprising:
transmitting a message indicating which one or more of a plurality of subframes is transmitted using the modified PSD, wherein the message is transmitted to a least one of the second lower power class eNodeB or one or more user equipments (UEs) served by the second lower power class eNodeB.

6. The method of claim 1, further comprising:
determining transmissions from one or more other first higher power class eNodeB will result in interference above the threshold with the transmission of the second instance of control information in the second control region in the subframe of the second lower power class eNodeB; and
prompting at least one of the one or more other first higher power class eNodeBs to modify the PSD of a transmission a corresponding subframe during the subframe of the first higher power class eNodeB.

7. The method of claim 6, wherein the at least one of the one or more other first higher power class eNodeBs modify the PSD of the corresponding subframe using a different PSD modification value than that used by the first higher power class eNodeB.

8. The method of claim 1, wherein the first higher power class eNodeB is a macro cell and the second lower power class eNodeB is a pico cell.

9. The method of claim 1, wherein the first higher power class eNodeB is a femto cell and the second lower power class eNodeB is either a pico cell or macro cell.

10. An apparatus for wireless communication, comprising:
means for determining a transmission of a first instance of control information in a first control region in a subframe of a first higher power class eNodeB using a non-modified power spectral density (PSD) will result in interference above a threshold with a transmission of a second instance of control information in a second control region in a subframe of a second lower power class eNodeB;
means for modifying the PSD for a portion of the first control region of the subframe for the first higher power class eNodeB, wherein the means for modifying comprises means for reducing the PSD for the portion of the first control region of the subframe of the first higher power class eNodeB; and
means for transmitting the first instance of control information during the first control region using the modified PSD for the portion of the first instance of control information.

11. The apparatus of claim 10, wherein the subframe of the first higher power class eNodeB is a multicast broadcast single frequency network (MBSFN) subframe, and wherein the subframe of the second lower power class eNodeB is a non-MBSFN subframe.

12. The apparatus of claim 10, wherein the means for reducing the PSD for the portion further comprises:
means for reducing the PSD for one or more channels scheduled for transmission during the control region, wherein the one or more channels comprise at least one of a common reference signal (CRS), a physical control format indicator channel (PCFICH), a physical hybrid ARQ indicator channel (PHICH), or a physical downlink control channel (PDCCH).

13. The apparatus of claim 10, wherein the means for reducing the PSD for the portion further comprises:
means for scheduling transmission of control channel information for a subframe other than the subframe of the first higher power class eNodeB that results in interference with the subframe of the second lower power class eNodeB.

14. The apparatus of claim 10, further comprising:
means for transmitting a message indicating which one or more of a plurality of subframes is transmitted using the modified PSD, wherein the message is transmitted to a least one of the second lower power class eNodeB or one or more user equipments (UEs) served by the second lower power class eNodeB.

15. The apparatus of claim 10, further comprising:
means for determining transmissions from one or more other first higher power class eNodeB will result in interference above the threshold with the transmission of the second instance of control information in the second control region in the subframe of the second lower power class eNodeB; and
means for prompting at least one of the one or more other first higher power class eNodeBs to modify the PSD of a transmission of a corresponding subframe during the subframe of the first higher power class eNodeB.

16. The apparatus of claim 15, wherein the at least one of the one or more other first higher power class eNodeBs modify the PSD of the corresponding subframe using a different PSD modification value than that used by the first higher power class eNodeB.

17. The apparatus of claim 10, wherein the first higher power class eNodeB is a macro cell and the second lower power class eNodeB is a pico cell.

18. The apparatus of claim 10, wherein the first higher power class eNodeB is a femto cell and the second lower power class eNodeB is either a pico cell or macro cell.

19. A computer program product, comprising:
a non-transitory computer-readable medium comprising code for:
determining a transmission of a first instance of control information in a first control region in a subframe of a first higher power class eNodeB using a non-modified power spectral density (PSD) will result in interference above a threshold with a transmission of a second instance of control information in a second control region in a subframe of a second lower power class eNodeB;
modifying the PSD for a portion of the first control region of the subframe for the first higher power class eNodeB, wherein the modifying comprises reducing the PSD for the portion of the first control region of the subframe of the first higher power class eNodeB; and
transmitting the first instance of control information during the first control region using the modified PSD for the portion of the first instance of control information.

20. The computer program product of claim 19, wherein the subframe of the first higher power class eNodeB is a multicast broadcast single frequency network (MBSFN) subframe, and wherein the subframe of the second lower power class eNodeB is a non-MBSFN subframe.

21. The computer program product of claim 19, wherein the non-transitory computer-readable medium further comprises code for:
reducing the PSD for one or more channels scheduled for transmission during the control region, wherein the one or more channels comprise at least one of a common reference signal (CRS), a physical control format indicator channel (PCFICH), a physical hybrid ARQ indicator channel (PHICH), or a physical downlink control channel (PDCCH).

22. The computer program product of claim 19, wherein the non-transitory computer-readable medium further comprises code for:
scheduling transmission of control channel information for a subframe other than the subframe of the first higher power class eNodeB that results in interference with the subframe of the second lower power class eNodeB.

23. The computer program product of claim 19, wherein the non-transitory computer-readable medium further comprises code for:
transmitting a message indicating which one or more of a plurality of subframes is transmitted using the modified PSD, wherein the message is transmitted to a least one of the second lower power class eNodeB or one or more user equipments (UEs) served by the second lower power class eNodeB.

24. The computer program product of claim 19, wherein the non-transitory computer-readable medium further comprises code for:
determining transmissions from one or more other first higher power class eNodeB will result in interference above the threshold with the transmission of the second instance of control information in the second control region in the subframe of the second lower power class eNodeB; and
prompting at least one of the one or more other first higher power class eNodeBs to modify the PSD of a transmission a corresponding subframe during the subframe of the first higher power class eNodeB.

25. The computer program product of claim 24, wherein the at least one of the one or more other first higher power class eNodeBs modify the PSD of the corresponding subframe using a different PSD modification value than that used by the first higher power class eNodeB.

26. The computer program product of claim 19, wherein the first higher power class eNodeB is a macro cell and the second lower power class eNodeB is a pico cell.

27. The computer program product of claim 19, wherein the first higher power class eNodeB is a femto cell and the second lower power class eNodeB is either a pico cell or macro cell.

28. An apparatus for wireless communication, comprising:
a processing system configured to:
determining a transmission of a first instance of control information in a first control region in a subframe of a first higher power class eNodeB using a non-modified power spectral density (PSD) will result in interference above a threshold with a transmission of a second instance of control information in a second control region in a subframe of a second lower power class eNodeB;
modifying the PSD for a portion of the first control region of the subframe for the first higher power class eNodeB, wherein the modifying comprises reducing the PSD for the portion of the first control region of the subframe of the first higher power class eNodeB; and
transmitting the first instance of control information during the first control region using the modified PSD for the portion of the first instance of control information.

29. The apparatus of claim 28, wherein the subframe of the first higher power class eNodeB is a multicast broadcast single frequency network (MBSFN) subframe, and wherein the subframe of the second lower power class eNodeB is a non-MBSFN subframe.

30. The apparatus of claim 28, wherein the processing system is further configured to:
reduce the PSD for one or more channels scheduled for transmission during the control region, wherein the one or more channels comprise at least one of a common reference signal (CRS), a physical control format indicator channel (PCFICH), a physical hybrid ARQ indicator channel (PHICH), or a physical downlink control channel (PDCCH).

31. The apparatus of claim 28, wherein the processing system is further configured to:
schedule transmission of control channel information for a subframe other than the subframe of the first higher power class eNodeB that results in interference with the subframe of the second lower power class eNodeB.

32. The apparatus of claim 28, wherein the processing system is further configured to:
transmit a message indicating which one or more of a plurality of subframes is transmitted using the modified PSD, wherein the message is transmitted to a least one of the second lower power class eNodeB or one or more user equipments (UEs) served by the second lower power class eNodeB.

33. The apparatus of claim 28, wherein the processing system is further configured to:
determine transmissions from one or more other first higher power class eNodeB will result in interference above the threshold with the transmission of the second instance of control information in the second control region in the subframe of the second lower power class eNodeB; and
prompt at least one of the one or more other first higher power class eNodeBs to modify the PSD of a transmission a corresponding subframe during the subframe of the first higher power class eNodeB.

34. The apparatus of claim 33, wherein the at least one of the one or more other first higher power class eNodeBs modify the PSD of the corresponding subframe using a different PSD modification value than that used by the first higher power class eNodeB.

35. The apparatus of claim 28, wherein the first higher power class eNodeB is a macro cell and the second lower power class eNodeB is a pico cell.

36. The apparatus of claim 28, wherein the first higher power class eNodeB is a femto cell and the second lower power class eNodeB is either a pico cell or macro cell.

* * * * *